June 23, 1925.  1,543,547
E. B. CARROLL
COTTON PICKING DEVICE
Filed Nov. 26, 1923   2 Sheets-Sheet 1
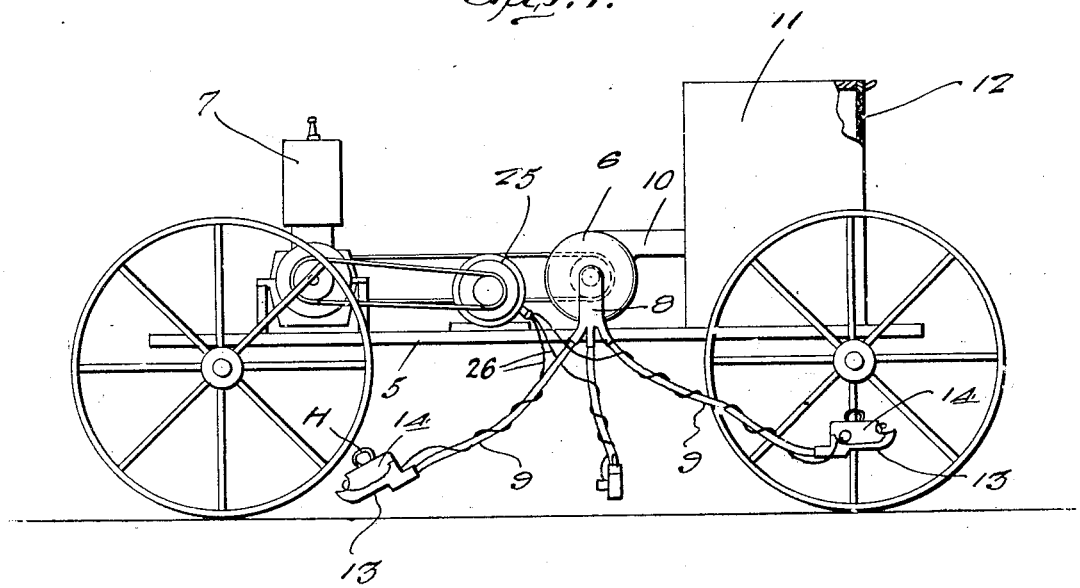
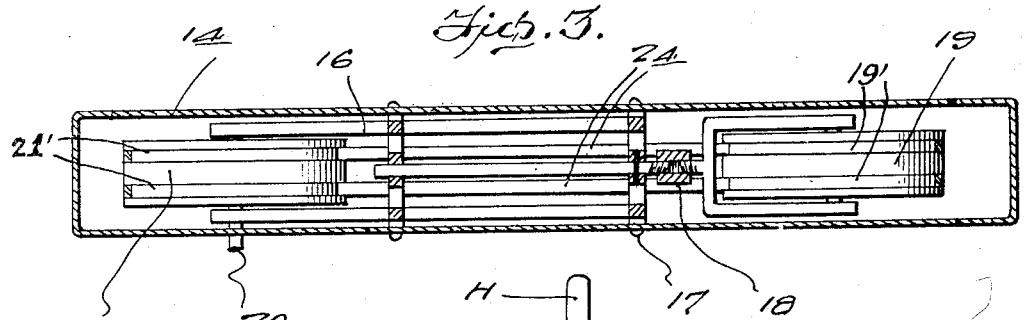
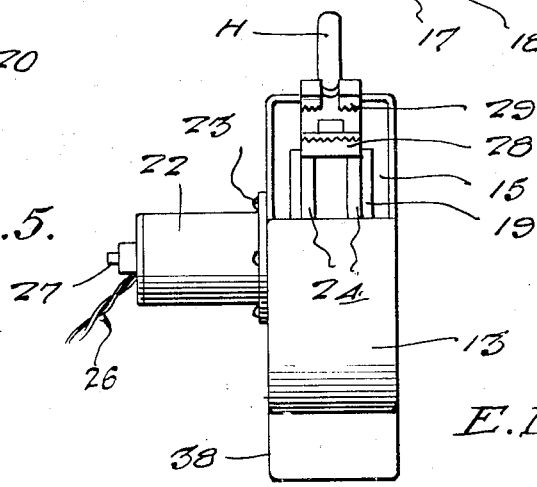
E. B. Carroll
Inventor

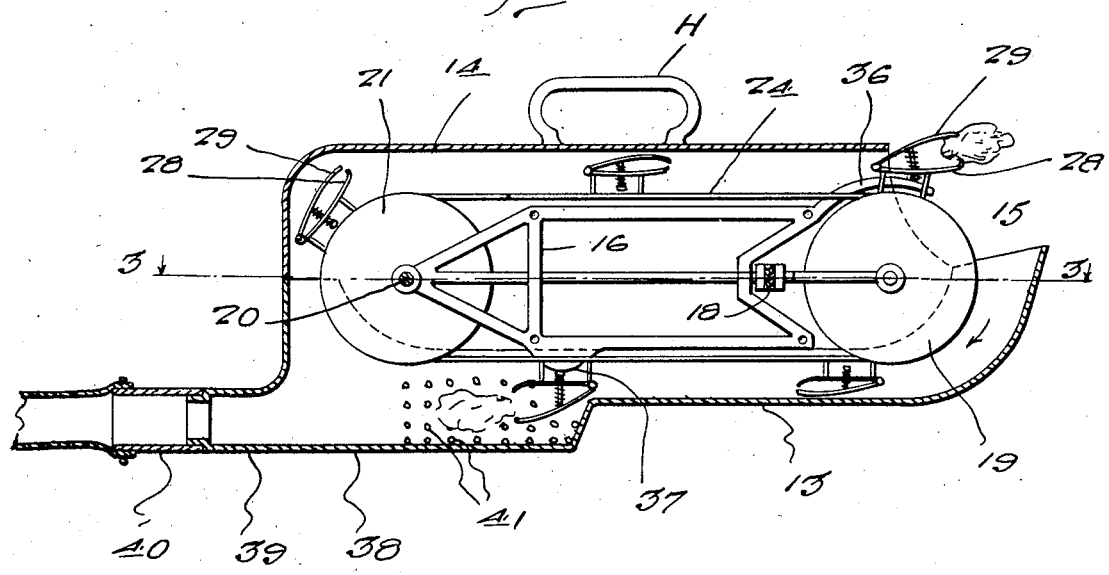
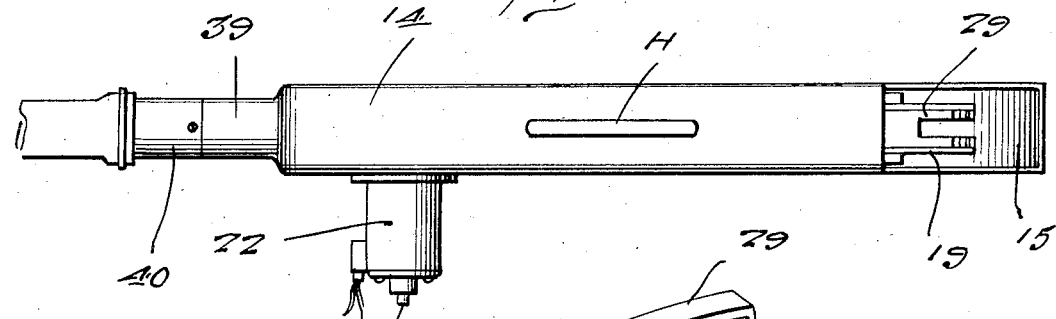
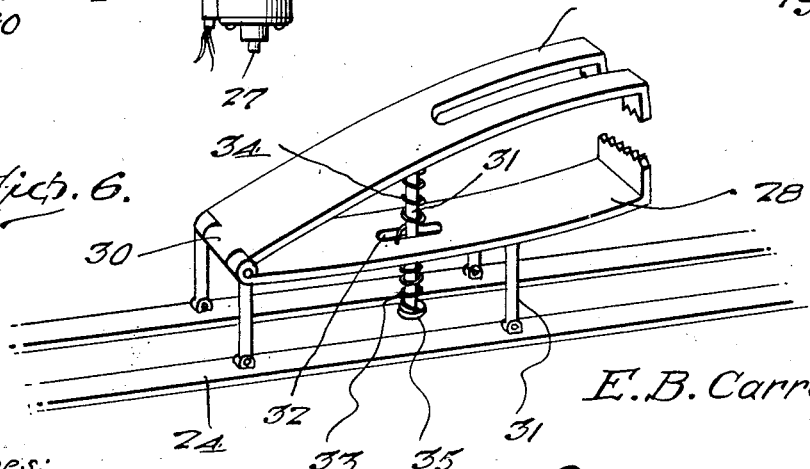

Patented June 23, 1925.

1,543,547

UNITED STATES PATENT OFFICE.

EDWARD B. CARROLL, OF MEMPHIS, TENNESSEE.

COTTON-PICKING DEVICE.

Application filed November 26, 1923. Serial No. 677,039.

*To all whom it may concern:*

Be it known that I, EDWARD B. CARROLL, citizen of the United States, residing at Memphis, in the county of Shelby and State of Tennessee, have invented certain new and useful Improvements in Cotton-Picking Devices, of which the following is a specification.

This invention relates to cotton picking devices capable of general application, but particularly adapted for use as a picking head or nozzle for pneumatic harvesting machines, wherein the detached cotton is delivered from the picking head or nozzle to a suitable receptacle through conduits in which suction is maintained.

The primary object of the invention is to provide a cotton picking device embodying simple, durable and efficient mechanism for detaching the cotton, and delivering the same to the inner discharge end of the picking head casing.

Another specific object of the invention is to provide a picking mechanism which operates somewhat similar to the human hand when in use, so that effective detachment of the cotton is insured.

Still another object of the invention is to provide a nozzle or head for pneumatic cotton harvesting machines that embraces picking mechanisms that may be cheaply and easily manufactured and placed into use, and wherein the picking head may be made of a comparatively small size characterized by lightness of weight, so that an operator may effectively use the same for a long continued period with ease and facility and without fatigue.

Other objects will become apparent as the nature of the invention will be better understood, and the same consists in the novel form, combination and arrangement of parts hereinafter more fully described, shown in the accompanying drawings and claimed.

In the drawings wherein like reference characters indicate corresponding parts throughout the several views:

Figure 1 is a somewhat diagrammatic side elevational view of a pneumatic cotton harvesting machine with its branch suction conduits equipped with nozzles constructed and provided with picking mechanism in accordance with the present invention.

Figure 2 is an enlarged substantially central longitudinal sectional view of one of the nozzles.

Figure 3 is a view in horizontal longitudinal section, taken substantially upon the line 3—3 of Figure 2, Figure 4 is a top plan view of the device shown in Figure 2, Figure 5 is a view in end elevation looking toward the outer end of the nozzle shown in Figure 2, and Figure 6 is an enlarged fragmentary perspective view showing details of construction of the cotton picking mechanism.

Referring more in detail to the drawings, and particularly to Figure 1, 5 indicates a suitable portable frame, upon which is mounted a suction fan 6 that is operatively connected to a suitable motor 7 and that has its intake pipe 8 provided with a plurality of flexible branch conduits 9, into and through which the cotton is drawn by the fan 6, the latter being provided with an outlet pipe 10 that discharges into a suitable receptacle 11 mounted upon the frame 5. This receptacle is usually provided with a foraminous wall portion as indicated at 12 by means of which the air delivered into the receptacle 11 may pass out of the same while retaining the cotton within said receptacle.

In the application of the invention as herein illustrated, the same is disclosed and to be described as used to form an intake nozzle for each of the branch flexible conduits 9. However, it is to be understood that, while the use of the invention as a picking head or nozzle for pneumatic harvesting machines is deemed preferable, the invention is nevertheless not limited to this use, should other applications of the invention be deemed of benefit and practical.

In the form of the invention shown, the picking head comprises an elongated casing composed of a lower section 13 and a cover section 14, adapted in any suitable manner for separation in order to permit access to the mechanism within the casing. As indicated generally at 15, the upper portion of the outer end of the casing is cut away so as to leave the same partially open for a purpose which will presently become apparent.

Centrally mounted within the casing of the picking head or nozzle is a suitable frame 16 of horizontally elongated form, and that is preferably rigidly secured to the sides of the cover section 14 of the casing by bolting or otherwise as generally indicated at 17 in Figure 3. The frame 16 is preferably extensible by forming the same of two parts connected by a turnbuckle construction as indicated at 18, and journalled in one section of the frame 16 adjacent the outer end of the casing of the nozzle is a pulley 19 that is preferably provided with a pair of parallel peripheral grooves 19'.

Journalled in the inner end of the inner section of the frame 18 is a transverse shaft 20 upon which is fixed another pulley 21 that is arranged between the side members of the inner frame section, as shown clearly in Figure 3, and that is also provided with a pair of spaced parallel peripheral grooves 21', similar to the grooves of the pulley 19, and aligned therewith. The shaft 20 projects through one side of the cover section 14, and is suitably rigidly connected to the armature shaft of a relatively small electric motor 22 that is bolted or otherwise secured as at 23 to the adjacent side of said casing section 14. A pair of spaced parallel belts 24 pass around the pulleys 19 and 21 in the respective aligned pairs of grooves of the latter, and it will thus be seen that by making the frame 16 extensible, these belts may be made tight or slack therein taken up within necessary limits. In order to provide for operation of the motor 22 whereby the shaft 20 may be rotated for causing travelling movement of the belt 24, a generator 25 may be mounted upon the portable frame 5 and operatively connected to the motor 7 as well as connected by wires 26 to the motor 22 for supplying current to the latter. A switch 27 may be provided at any suitable point for rendering the motor 22 operative or inoperative at will.

Carried by the belts 24 at suitable intervals, are a plurality of cotton picking elements, all of which are of the same construction so that a description of one will suffice. As shown clearly in the several views, each picking element consists of a pair of jaws 28 and 29 disposed one outwardly of the other and pivotally connected at adjacent ends as at 30 for swinging movement toward and away from each other, the inner jaw 28 being suitably mounted by means, generally indicated at 31 upon the belt 34 so as to be spaced outwardly a slight distance relative to each other, and by means of which the inner jaw 28 is stationary, and the outer jaw 29 arranged to move toward and away from said inner jaw.

The outer jaw 29 carries an inwardly extending transversely arranged pin or rod 31 that slidably and loosely passes through an elongated longitudinally disposed slot 32 provided in the inner jaw member 28, and coil springs 33 and 34 surround the rod 31. The spring 33 has its inner end bearing against the inner side of the inner jaw 28 and its other end bearing against a head 35 provided upon the free end of the rod 31, while the spring 35 has its opposite end respectively bearing upon the inner faces of the jaws 28 and 29. In this manner, the jaws assume a partially closed position under normal conditions.

Projecting upwardly and outwardly from the outer end of the inner frame section is a stationary cam 36 that passes between the belt 34 at the inner side of the opening 15 in the nozzle casing, said stationary cam being in the path of the head 35 of the rod 31. The inner section of the frame 16 is further provided at its lower rear portion with a second outwardly projecting stationary cam 37 that also passes between the belt 34 in the path of the head 35 of the rod 31 of each picking element.

As probably shown more clearly in Figure 2, the inner portion of the bottom casing section 13 is provided with a depending enlarged portion 38 from which extends a discharge pipe 39 for the nozzle, which discharge pipe is in the present instance shown, as provided at the inner end and the bottom portion of the lower casing section 13 and provided with means generally indicated at 40 for coupling the same with the outer end of one of the branch conduits 9 of the suction fan intake pipe 8. The enlarged portion 38 is also provided with numerous perforations as at 41 which permit the entrance of air while excluding foreign matter, such as dirt, vines and other trash.

In operation, the motor 22 is started, so as to drive the shaft 20 and cause travelling movement of the belt 24, so that the upper strands of the latter move toward the opening 15, thereby causing the picking elements to successively move outwardly through said opening 15 in position to receive the cotton to be picked. As each element passes outwardly through the opening 15 in travelling about the outer roller 19, the rod 31 thereof engages the stationary cam 36 so as to cause outward swinging movement of the outer jaw 29, of said picking element against the action of the spring 33 thereof. When the outer jaw is thus separated or swung away from the inner jaw 28 of the picking element, the cotton may readily pass inwardly between the free ends of the jaws, so that upon further travelling movement of the picking element to a point wherein the rod 31 of the same passes off of the free end of the stationary cam 36, the spring 33 of said picking element will serve to cause inward swinging movement of the outer jaw 29 of the latter so as to firmly grip the cotton in cooperation with the inner jaw 28. Continued travelling movement of the picking element with the belt 24 to which it is attached causes detachment of the cotton from the boll at the lower portion of the opening 15 from which opening the detached cotton is conveyed downwardly and rearwardly into the enlarged portion 38 of the nozzle. When the picking element arrives at this point, the stationary cam 37 operates similar to the stationary cam 36 for swinging the outer jaw 29 of the picking element outwardly to release the cotton between the jaws 28 and 29 of said element, so that the released cotton may be effectively drawn out of the casing by the suction maintained in the branch conduit 9 to which the nozzle is attached. For facilitating directing of the nozzle so that the picking element will engage the cotton to be picked, a suitable handle H may be rigidly attached to the top wall of the upper casing section 14, and it is noted that by reason of the provision of the perforations 14 for the intake of air, practically no suction will be experienced at the opening 15 for drawing trash into said last named opening.

From the above description, it will be seen that the picking mechanism is of substantially continuous form as to operation, and the action of the same quite closely resembles that of the human hand during the cotton picking operation.

It will also be seen that the device may be cheaply and easily constructed so as to be light and small, and also very strong and durable. Furthermore, by reason of the fact that the air is taken in at a point remote from the point where cotton is detached from the boll, and in the particular manner set forth, it is possible to pick and collect the cotton in a clean and desirable state.

From the above description, it is believed that the construction and advantages, as well as the operation of the present invention will be readily understood and appreciated by those skilled in the art.

What I claim as new is:

1. In a cotton picker, a head, carriers housed in the head, driving means upon which the said carriers are supported pivoted jaws mounted upon the carriers, one of which has legs which engage the carrier whereby the jaws are held spaced from the carrier, a pin carried by one of the jaws and passing transversely through the other jaw at a point between the supporting legs and having one end disposed toward the carrier, spring sections connected at their outer ends with the pin and bearing at their inner ends against the opposite sides of that jaw through which the pin passes, and relatively stationary cam means with which the said pin is adapted to cooperate for opening said jaws.

2. In a cotton picker of the class described, a head, a longitudinally adjustable supporting frame mounted in said head, rotary carriers mounted for rotation at opposite ends of the frame, driving means upon which said carriers are mounted, belts trained over said carrier, said frame being provided at predetermined points with stationary cams, pivoted jaws mounted upon said belts, one of which is relatively stationary, and the remaining one of which is relatively movable, said relatively stationary jaw being spaced from said belt, a pin carried by the removable jaw and extending slidably through the relatively stationary jaw, spring means in association with said pin and jaw, for normally maintaining the same closed, said pin being cooperative with said cams for opening said jaws at predetermined intervals.

In testimony whereof I affix my signature.

EDWARD B. CARROLL.